United States Patent [19]
Schüler et al.

[11] Patent Number: 5,564,315
[45] Date of Patent: Oct. 15, 1996

[54] LOCKING SYSTEM FOR VEHICULAR SEATS, IN PARTICULAR FOR MOTOR VEHICLE SEATS

[75] Inventors: Rolf Schüler, Heiligenhaus; Udo Orzech, Wuppertal; Ulrich Lehmann, Alfter-Bonn, all of Germany

[73] Assignee: Keiper Recaro GmbH & Co., Remscheid, Germany

[21] Appl. No.: 371,391

[22] Filed: Jan. 11, 1995

[30] Foreign Application Priority Data

Jan. 11, 1994 [DE] Germany .................. 44 00 474.5

[51] Int. Cl.⁶ .................................................. G05G 5/06
[52] U.S. Cl. .......................... 74/527; 74/535; 74/536; 74/537; 248/429; 248/424
[58] Field of Search .................. 74/526–540; 70/261, 70/209; 248/408, 423, 429, 430; 297/311, 344.1, 344.11; 403/104–108

[56] References Cited

U.S. PATENT DOCUMENTS

| 2,066,557 | 1/1937 | Cox | 246/429 |
|---|---|---|---|
| 4,189,957 | 2/1980 | Gedig et al. | 74/535 |
| 4,378,927 | 4/1983 | Graves | 248/561 |
| 4,384,701 | 5/1983 | Barley | 248/561 |
| 4,712,759 | 12/1987 | Sugama et al. | 248/429 |
| 5,234,189 | 8/1993 | Myers | 248/429 |

FOREIGN PATENT DOCUMENTS

| 0408932 | 4/1992 | European Pat. Off. | 74/535 |
|---|---|---|---|
| 2729770C2 | 3/1982 | Germany . | |

*Primary Examiner*—Vinh T. Luong
*Attorney, Agent, or Firm*—Wigman, Cohen, Leitner & Myers, P.C.

[57] ABSTRACT

A locking system for vehicular seats, in particular motor vehicle seats, is described and includes a rail (9), having a row of identically designed snap-in holes (11), which are separated by identically long, web-like material members (13), and a part having with a pair of bolts (1, 7), which can be moved relative to the rail. The bolts (1, 7) of the pair of bolts can be moved independently of each other at right angles to the longitudinal direction of the rail. In each position along the rail (9) at least one bolt (1, 7) can fall into a snap-in hole (11). One of the bolts (1) has a segment (3), which tapers away from the basic body (1') and includes an end which has a smaller cross section and which adjoins an end segment (5), that faces the rail. The largest width of the pair of bolts (1, 7) exceeds the length of the snap-in holes (11). The smallest distance between the bolts (1) and (7) is larger than the width of the web-like material parts (13).

18 Claims, 2 Drawing Sheets

LOCKING SYSTEM FOR VEHICULAR SEATS, IN PARTICULAR FOR MOTOR VEHICLE SEATS

BACKGROUND OF THE INVENTION

The invention relates to a locking system for vehicular seats, in particular, for motor vehicle seats which can be slid longitudinally in the direction of travel. Locking systems for vehicular seats that can be fixed in selectable positions are described in DE 27 29 770 C2 wherein a stationary rail is provided with identical snap-in holes arranged in a row at equal intervals. Two bolts which are connected to the vehicular seat and engage with the rail can fall independently of each other into the snap-in holes. For safety reasons, such a locking system is designed such that at least one bolt can fall in each selectable seat position. If only one of the two bolts engages with one of the snap-in holes, the seat can be slid until the second bolt drops in. However, even then the seat is movable because a certain play between the bolt and the snap-in holes is needed to ensure that the bolt will drop into the snap-in holes. This play leads to an annoying chatter.

OBJECTS AND SUMMARY OF THE INVENTION

A principal object of the present invention is to provide an improved locking system which avoids the chatter problem of the prior art systems.

Other objects and advantages of the present invention will become apparent from the description which follows.

Briefly stated, the end of the bolt that drops first into the rail has an end segment with an average diameter of its cross sectional area which is smaller than the average diameter of the cross sectional area of the ends of the snap-in holes and their clear width in the slotted center section. Since the length of the snap-in holes in the longitudinal direction of the rail is greater than the dimension of the pair of bolts, and the distance between snap-in holes is smaller than the distance between the bolts, there is so much play that the bolts can fall reliably into the snap-in holes. Since, however, the diameter of the cross sectional area of the ends of each snap-in hole is smaller than the diameter of the largest cross sectional area of the tapering section, when both bolts have fallen into their locking position, the locking system according to the invention is without play and thus also without chatter.

If only one of the bolts has a tapering section, it is advantageous if the clear width of the center section of each snap-in hole is smaller than the average diameter of the cross sectional area of the ends of each snap-in hole, since after this one bolt has dropped in completely, all play is eliminated.

The average diameter of the cross sectional area of the ends of the snap-in hole is advantageously closer to the value of the average diameter of the largest cross sectional area of the tapering section than the value to the average diameter of its smallest cross sectional area, because then the bolt interacts with the rail in a region of higher load capacity.

The lack of a self-locking action between the tapering section and the rim of a snap-in hole in the case of contact has the advantage that when an overproportional load is put on the locking system, e.g. during a crash, the bolt can be slid out of the snap-in hole until its end segment becomes effective and thus the contact area between the bolt and the wall of the snap-in hole is significantly enlarged.

Cylindrical or prismatic base bodies can be combined with conical or truncated pyramidal, tapering segments and cylindrical or prismatic end segments of the bolts, as well as ends of the snap-in holes that have curved or polygonal rims.

BRIEF DESCRIPTION OF THE DRAWINGS

The invention is explained in detail with reference to four embodiments illustrated in the drawings, wherein.

DETAILED DESCRIPTION OF THE PREFERRED EMBODIMENTS

Figure 1A:
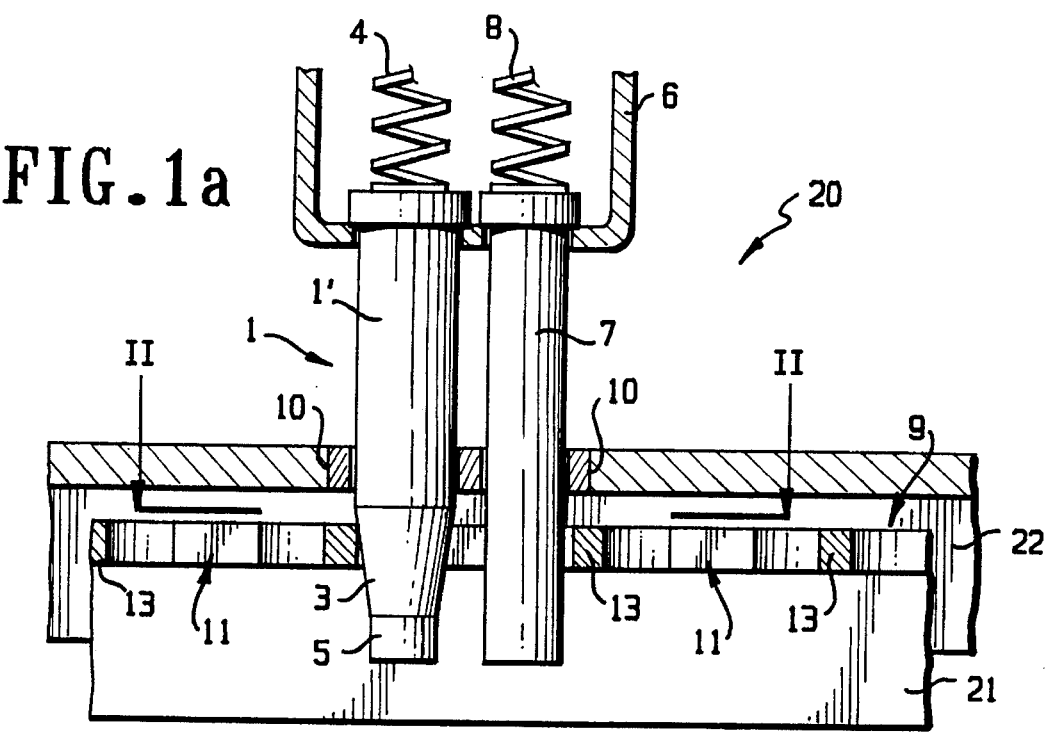
FIG. 1a is a side elevational view (partly in section) of the first embodiment of the present invention depicting the bolts falling into a snap-in hole.
Figure 1B:
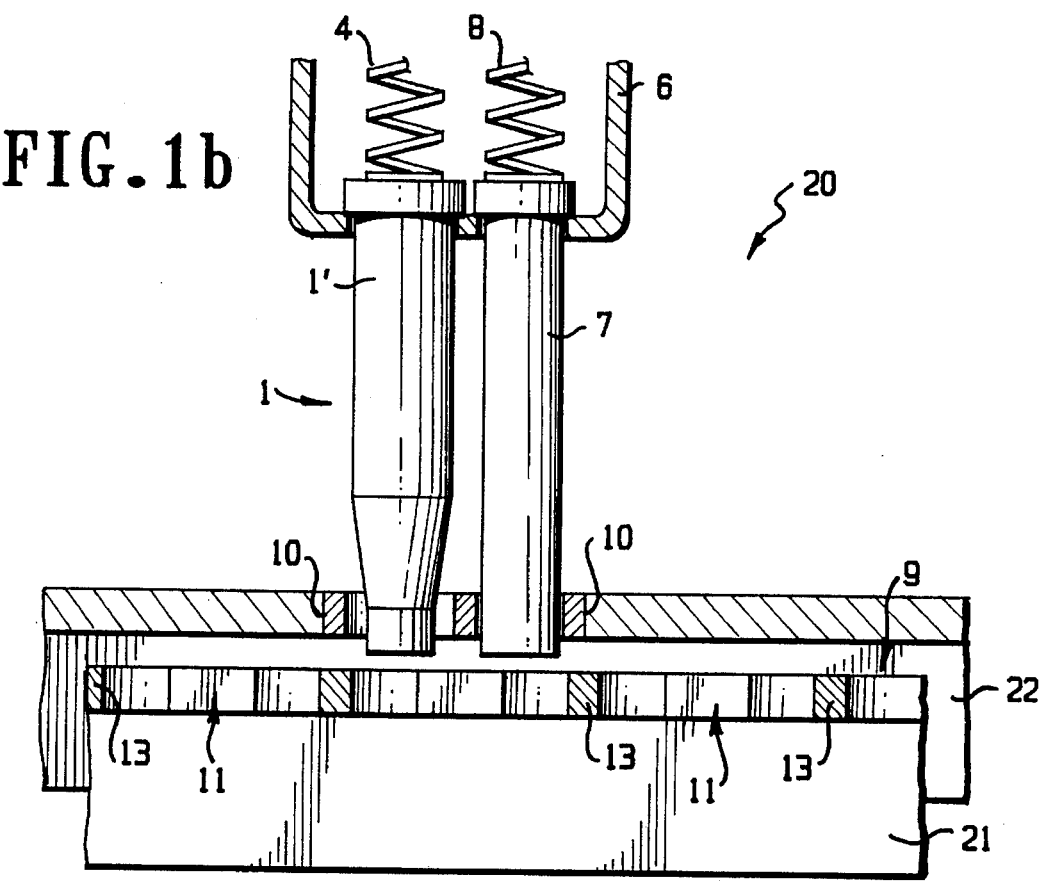
FIG. 1b is a side elevational view (partly in section) of the first embodiment of the present invention depicting the bolts in a retracted position.
Figure 2:
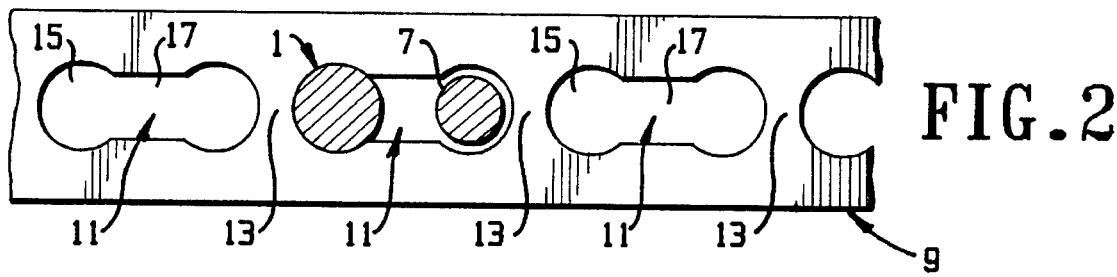
FIG. 2 is a plan view (partly in section) of the first embodiment of the present invention taken along line II—II of FIG. 1 and showing the side of the rail that faces the locking system.

Referring now to FIG. 1 wherein the first embodiment of the present invention shows a locking system 20 for vehicular seats having two parts, 21 and 22. The second part, 22 in particular for motor vehicle seats, having a pair of bolts 1, 7. Bolt 1 includes a conical segment 3. The locking system also comprises first part 21 including a rail 9 provided with snap-in holes 11.

Bolt 1 further includes a cylindrical upper body 1', in addition to the lower tapering conical segment or cone 3. A cylindrical end segment 5 is provided on bolt 1. The diameter of cylindrical end segments is smaller than the diameter of the upper body 1'. The upper end portion of the conical segment 3 adjoins the lower end portion of the cylindrical body 1' and has the same diameter as body 1. Cylindrical end segment 5 adjoins the lower end of the conical segment 3 and has the same diameter as said lower end. On the end of the upper body 1' that faces away from cone 3 said body includes a head 2 or the like, against which is braced a spring 4 loading the bolt 1 in the longitudinal direction. On the side facing away from spring 4, a lifter 6 (which is depicted only schematically) and which can be operated against the force of the spring engages the underside of head 2 of bolt 1.

A second bolt 7 is arranged parallel to bolt 1. Bolt 7 is cylindrical and is the same length as bolt 1. Bolt 7 has the same diameter as the end segment 5 of bolt 1. As with bolt 1, bolt 7 includes a head 2', against which is braced a spring 8, which loads bolt 7 in the longitudinal direction. On the side facing away from spring 8, lifter 6, which engages the underside of head 2 of bolt 1, also engages the underside of head 2' of bolt 7.

Bolts 1 and 7 can be moved in their longitudinal direction independently of each other. The requisite guide 10 to this end is indicated only schematically in FIG. 1. This direction of movement extends at right angles to the rail's 9 direction of stretch. Rail 9 does not have to be a separate component. For example, it can also be formed by an area of a component that also fulfills another function. Rail 9 includes several identically designed snap-in holes 11, which extend in a row in the longitudinal direction of the rail. Holes 11 are separated from each other by web-like material members 13, all of which have the same length in the longitudinal direction of the rail. The combination of bolts 1 and 7 and rail 9 with snap-in holes 11 can be adjusted relative to each other and form the locking system according to the present invention.

Lifter 6 is shown in its unoperated position in FIG. 1. Bolt 1 can penetrate snap-in holes 11 of rail 9 until its conical segment 3 rests against the upper rim of one of the snap-in holes 11. As with bolt 1, bolt 7 can totally penetrate rail 9.

Each snap-in hole 11 includes three parts, cylindrical ends 15 bridged by a center section 17. Ends 15, 15' of snap-in hole 11 are circularly curved, having a constant diameter over a major portion of its periphery, i.e. more than 180°. Ends 15, 15' of each snap-in hole 11 have the same radius. Ends 15' are connected via said slotted, parallel center section 17, which has a width at right angles to the longitudinal direction of the rail which is smaller than the diameter of ends 15, 15' of snap-in hole 11.

The longitudinal axes of ends 15, 15' of the snap-in holes 11 are spaced apart and conform to the same spacing as that provided for the longitudinal axes of bolts 1, 7. The width of the center section 17 is greater than the diameter of end segment 5 of bolt 1 and the diameter of bolt 7. The diameter of the ends 15, 15' of snap-in hole 11 is between the smallest and the largest diameter of cone 3 of bolt 1, and in particular advantageously closer to the largest diameter of cone 3. The diameter and the axial distance of the ends 15, 15' of snap-in hole 11 are chosen in such a manner that the length of each snap-in hole 11 that is measured in the longitudinal direction of the rail is smaller than the largest width of the pair of bolts, which results from the sum of the largest diameter of bolt 1, the diameter of bolt 7, and the smallest distance between bolts 1 and 7.

The web-like material members 13 have a width in the longitudinal direction of the rail that is smaller than the smallest distance between bolts 1 and 7, thus smaller than the distance of the longitudinal axes of bolts 1 and 7 minus half of the largest diameter of bolt 1 and minus half of the diameter of bolt 7.

In operation, to release the locking device by means of an operating lever or the like, bolts 1 and 7 are lifted together completely out of the rail 9 by means of lifter 6. After adjusting the position of the vehicular seat to its desired position, the operating lever is released, and lifter 6 releases bolts 1, 7, which are in turn pushed against the rail 9 by springs 4, 8. The selected diameter of end segment 5 of bolt 1 and the diameter of bolt 7 on the one hand and the dimensions of the snap-in hole 11 and the web-like material member 13 on the other hand ensure that at least one of the spring-loaded bolts will fall into one of the snap-in holes 11. If the other bolt is then pushed against a web-like material member 13, this other bolt, which is spring-loaded, falls into the same or an adjacent snap-in hole 11 during the next movement of the vehicular seat owing to the still existing movability of the engaged bolt in the longitudinal direction of the snap-in hole 11.

As soon as bolt 7 is engaged, bolt 1 is pushed into the snap-in hole 11 until its cone 3 comes to rest against the rim of the snap-in hole 11. Contact is made along a circular arc. Since ends 15, 15' of snap-in holes 11 have a larger diameter than the open width of the center section 17, the result is that cone 3 of the bolt 1 rests against end 15 without play in any direction. Thus, the entire locking device exhibits no play, and thus chattering is prevented.

Cone 3 does not rest self-lockingly against the edge of snap-in hole 11. If now the vehicular seat is highly loaded in the longitudinal direction, e.g. due to a crash, this force is transferred in the longitudinal direction via the inclined surface of cone 3 to bolt 1. The bolt is now pushed back against the spring force loading it until either its end segment 5 or bolt 7 makes surface contact with an end 15 of snap-in hole 11.

The vehicular seat can also include on its two rails not only one locking device but two independent locking devices, which can be rotated 180°. Then, in case of a crash, bolt 1 with cone 3 and bolt 7 without a cone, will make surface contact with the wall of two snap-in holes.

Figure 3:
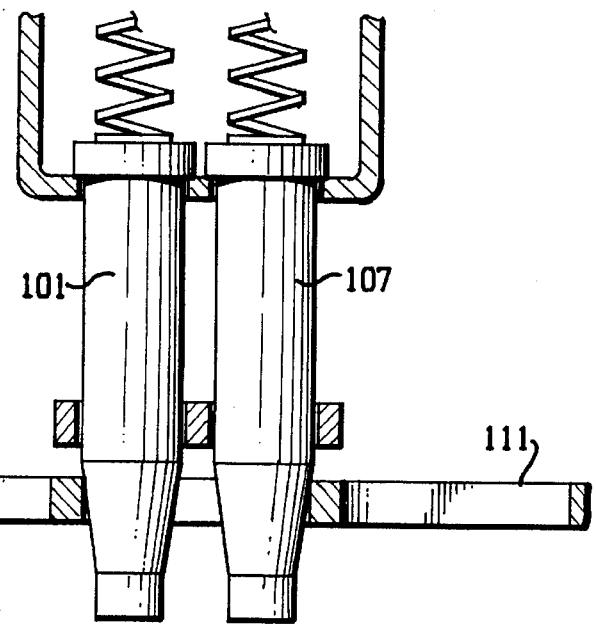
FIG. 3 is a side elevational view (partly in section) of the second embodiment of the present invention depicting the bolts falling into a snap-in hole.

Referring to FIG. 3, the second embodiment of the locking system of the present invention includes a pair of identically designed bolts 101, 107. Bolt 101 is of the same construction as bolt 1 of the first embodiment. Bolt 107 has a cylindrical upper body, a tapering or conical segment adjoining said upper body and a circularly cylindrical end segment. The dimensions of bolt 107 are identical to the dimensions of bolt 101. Except for the other dimensions of the locking system, caused by the larger diameter of the upper body of bolt 107, in particular, a larger axial distance between bolts 101 and 107, the other parts of the second embodiment locking system agree with the corresponding parts of the first embodiment. The length of snap-in holes 111 in the longitudinal direction of the rail is also adjusted to the enlarged axial distance of bolts 101, 107. Because bolts 101, 107 include a tapering segment, the open width of the center section at right angle to the longitudinal direction of the rail does not have to be smaller than the diameter of the ends of the snap-in hole in order for the locking system to engage without play.

Figure 4:
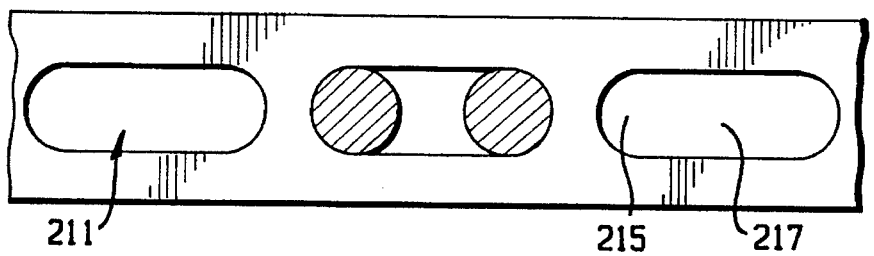
FIG. 4 is a plan view (partly in section) of the third embodiment of the present invention taken along the side of the rail that faces the locking system.

The third embodiment of the locking system of the present invention is illustrated in FIG. 4. Snap-in holes 211, whose center sections 217 include an open width that is identical to the diameter of the cylindrically curved ends 215 of snap-in hole 211. The remaining features of the third embodiment are the same as the second embodiment illustrated in FIG. 3.

Besides circularly cylindrical and conical shapes, the bolts and the snap-in holes can also be designed with prismatic and truncated pyramidal parts.

Figure 5:
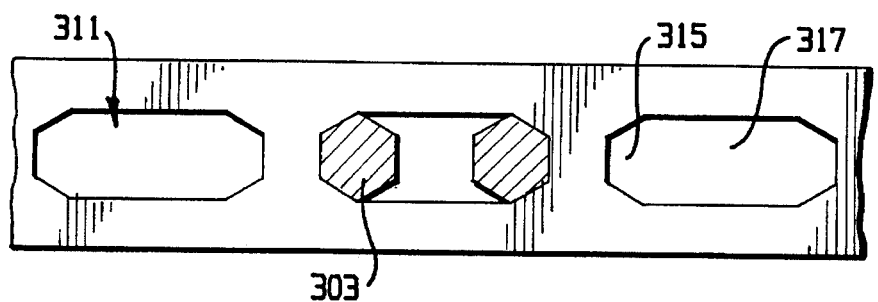
FIG. 5 is a plan view (partly in section) of the fourth embodiment of the present invention taken along the side of the rail that faces the locking system.

The fourth embodiment of the present invention is illustrated in FIG. 5. Each bolt has a tapering segment, as with bolt 101, except it is designed as a truncated pyramid 303 which has a cross sectional area in the shape of a regular hexagon. The ends 315 of snap-in holes 311 have a halved regular hexagon as the cross sectional area. The average diameter of the respective cross sectional areas that is required to guarantee that at least one of the bolts will drop in and to guarantee freedom of play after the two bolts have dropped in results from the orientation of the cross sectional areas when the bolts rest against the ends 315 of the snap-in holes 311. In this embodiment the surrounding of the regular hexagon defines this diameter. If both bolts exhibit, as in the embodiment, a tapering segment, then the clear width of the center section 217 of the snap-in hole 311 at right angle to the longitudinal direction of the rail can be equal to the diameter of ends 315 of snap-in hole 311.

The design of the upper body, the tapering segment and the end section of the bolts with cylindrical and prismatic or conical and truncated pyramidal parts at one or both bolts in combination with curved or polygonal rimmed ends of the snap-in holes yield other embodiments. In particular, the snap-in holes can have different cross sectional areas on the entry side of the bolts and on the side facing away from said entry side by designing conical and truncated pyramidal ends and center sections of the snap-in holes, instead of cylindrical or prismatic shapes.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed:

1. Locking system for vehicular seats comprising:
   (a) a first part and a second part that are movable relative to each other;
   (b) a rail associated with one part, said rail extends longitudinally in the direction of adjustment and includes at least one row of identical snap-in holes having rims, separated from each other by means of web members all of which have an identical length in the longitudinal direction of the rail;
   (c) a pair of bolts operatively connected to the other part, said bolts being independently movable at right angles to the longitudinal direction of said rail, one said bolt being capable of falling into one of the snap-in holes in each position of the parts, moved relative to each other in each position;
   (d) at least one of said bolts having an upper portion and a lower segment that extends from the upper portion for engaging said rail, said lower conical segment having a larger end and a smaller end and said lower segment being selected from the group of conical segments and pyramidal segments;
   (e) an end segment being selected from the group of cylindrical and prismatic end sections, which adjoins the smaller end of the lower segment;
   (f) the distance between said pair of bolts is at least equal to the width of the web members:
   (g) the diameter of the cross sectional area of both ends of each snap-in hole is larger than the diameter of the smallest and is smaller than the diameter of the largest cross sectional area of the lower segment of one of said bolts, and wherein the diameter of the cross sectional area of both ends of each snap-in hole is larger than the diameter of the cross sectional area of the end segments of said bolts;
   (h) the center section which connects the two ends of each snap-in hole is a slot having a clear width that is larger than the diameter of the cross sectional area of the end segments of said bolts; and
   (i) the length of each snap-in hole when measured in the longitudinal length of the rail is smaller than the largest width of each pair of bolts, and the width of the web members is smaller than the smallest distance between said bolts.

2. Locking system as recited in claim 1, wherein only one bolt of each pair of bolts includes a lower tapered conical segment.

3. Locking system as recited in claim 2, wherein the diameter of the cross sectional area of the end segment of said one bolt is equal to the diameter of the cross sectional area of said second bolt of each pair of bolts.

4. Locking system as recited in claim 3, wherein the shape of said snap-in hole is cylindrical.

5. Locking system as recited in claim 3, wherein the shape of said snap-in hole is polygonal.

6. Locking system as recited in claim 2, wherein the shape of said snap-in hole is cylindrical.

7. Locking system as recited in claim 2, wherein the shape of said snap-in hole is polygonal.

8. Locking system as recited in claim 1, wherein the clear width of the center section of each snap-in hole is smaller than the diameter of the cross sectional area of both ends of each snap-in hole.

9. Locking system as recited in claim 8, wherein the shape of said snap-in hole is cylindrical.

10. Locking system as recited in claim 8, wherein the shape of said snap-in hole is polygonal.

11. Locking system as recited in claim 1, wherein the diameter of the cross sectional area of the snap-in holes comes closer to the diameter of the largest cross sectional area of the lower segment than to the diameter of the smallest cross sectional area.

12. Locking system as recited in claim 11, wherein the shape of said snap-in hole is cylindrical.

13. Locking system as recited in claim 11, wherein the shape of said snap-in hole is polygonal.

14. Locking system as recited in claim 1, wherein the conical segment does not rest self-lockingly when its rests against the rim of a snap-in hole.

15. Locking system as recited in claim 14, wherein the shape of said snap-in hole is cylindrical.

16. Locking system as recited in claim 14, wherein the shape of said snap-in hole is polygonal.

17. Locking system as recited in claim 1, wherein the shape of said snap-in hole is cylindrical.

18. Locking system as recited in claim 1, wherein the shape of said snap-in hole is polygonal.

* * * * *